United States Patent [19]

Iwamura et al.

[11] Patent Number: 4,955,048
[45] Date of Patent: Sep. 4, 1990

[54] MULTIPLEX TRANSMISSION OF AUDIO SIGNAL AND VIDEO SIGNAL THROUGH INHOUSE CABLE

[75] Inventors: Soichi Iwamura, Fuchu; Satoshi Murakami, Nagareyama; Tadashi Itsumi, Kashiwa, all of Japan

[73] Assignee: Sharp Kabushiki Kaisha, Osaka, Japan

[21] Appl. No.: 323,197

[22] Filed: Mar. 13, 1989

Related U.S. Application Data

[63] Continuation of Ser. No. 43,757, Apr. 29, 1987, abandoned.

[30] Foreign Application Priority Data

Apr. 30, 1986 [JP] Japan .................. 61-100185
Apr. 30, 1986 [JP] Japan .................. 61-100187

[51] Int. Cl.$^5$ .................. H04M 11/00; H04N 7/14
[52] U.S. Cl. .................. 379/53; 379/103; 358/12; 358/16; 358/85; 358/143
[58] Field of Search .................. 379/53, 54, 103; 358/12, 15, 16, 85, 142, 143, 19

[56] References Cited

U.S. PATENT DOCUMENTS

| | | | |
|---|---|---|---|
| 3,492,418 | 1/1970 | Tanner . | |
| 3,820,154 | 6/1974 | Faroudja et al. | 358/19 |
| 3,872,498 | 3/1975 | Pritchard | 358/30 |
| 3,893,163 | 7/1975 | Wessels et al. | 358/12 |
| 3,974,337 | 8/1976 | Tatsuzawa | 358/85 |
| 4,217,603 | 8/1980 | Hjortzberg | 358/16 |
| 4,291,330 | 9/1981 | Hira | 358/39 |
| 4,346,397 | 8/1982 | Ota | 358/11 |
| 4,573,086 | 2/1986 | Sakai et al. | 358/11 |
| 4,658,305 | 4/1987 | Tsushima | 358/340 |

FOREIGN PATENT DOCUMENTS

| | | |
|---|---|---|
| 0157460 | 2/1985 | European Pat. Off. . |
| 1425341 | 1/1972 | United Kingdom . |
| 1524183 | 8/1974 | United Kingdom . |

OTHER PUBLICATIONS

Yoshio Katagiri et al, "A Digital Video Telephone Subscriber Set with 64 Kbit/s Transmission Rate", NTG-Fachber, (Germany), vol. 73, (1980), pp. 167-171.

R. P. Gabriel, "Dial a Program-an HF Remote Selection Cable Television System"; Proceedings of the IEEE, vol. 38, No. 7, Jul. 1970, pp. 1016-1023.

*Primary Examiner*—Jin F. Ng
*Assistant Examiner*—Wing F. Chan

[57] ABSTRACT

In a method for multiplexing the transmission of audio and video signals, the video signal is separated into a luminance signal and a chrominance signal. The luminance signal is then modulated, and the chrominance signal is balanced-modulated with a low-frequency carrier. The chrominance signal is then converted to a lower frequency. The audio signal, frequency-modulated luminance signal and frequency-converted chrominance signal and frequency-converted chrominance signal are multiplexed by frequency division to be transmitted across telephone cable. Consequently, in comparison with the conventional transmission method which executes direct frequency modulation of the video signal, the band-width of the frequency-modulated luminance signal becomes narrower to eventually facilitate multichannel transmission. The harmful influence from interference from external radio waves or from metallic members used to fix the cable is removed on the receiver side. Accordingly, satisfactory picture transmission can be performed without the necessity of any additional coaxial cable for video signal transmission.

15 Claims, 7 Drawing Sheets

MULTIPLEX TRANSMISSION OF AUDIO SIGNAL AND VIDEO SIGNAL THROUGH INHOUSE CABLE

This application is a continuation of application Ser. No. 043,757 filed on Apr. 29, 1987, now abandoned.

BACKGROUND OF THE INVENTION

1. Field of the Invention

The present invention relates to a method for accomplishing audio-video multiplex transmission through a pair of telephone communication cables by multiplexing simultaneous two-way voice signals and a frequency-modulated carrier of monochrome/color signal,

2. Description of the Prior Art

Figure 1:
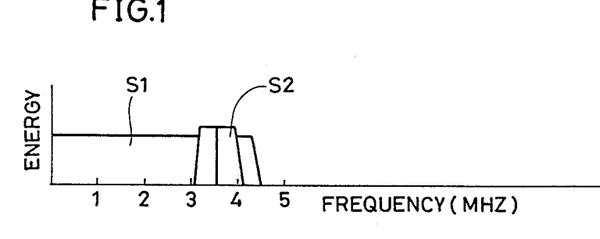
FIG. 1 is a spectrum distribution diagram of NTSC signal.

The conventional method of baseband-transmitting simultaneously two-way voice signals through a pair of telephone communication cables and a video signal with power supply through co-axial cable, respectively, is employed in a door-phone camera and so forth. As will be understood from the spectrum distribution of NTSC (National Television System Committee) signal as shown in FIG. 1, many times a video signal will often include a low frequency spectrum having at its lower end a DC component. In this diagram, S1 represents the spectrum of a luminance signal and S2 represents a chrominance subcarrier.

Figure 2:
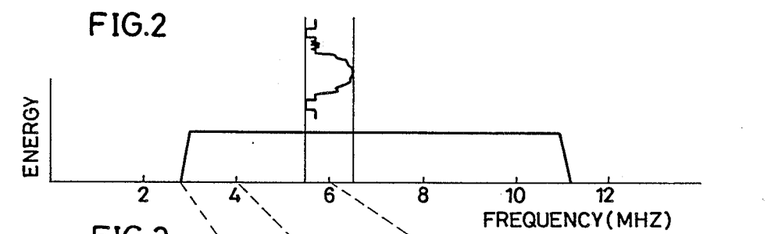
FIG. 2 is a spectrum distribution diagram obtained when a video carrier is directly frequency-modulated by the NTSC signal.

When audio and video signals are directly multiplexed according to the conventional method of transmission, a disadvantage arises. The disadvantage is that the low-frequency component of the video signal overlaps with the audio signals in baseband transmission. For the purpose of preventing such spectra of audio and video signals from overlapping, a carrier is frequency-modulated by the video signal so as to avoid any video component appearing in its low-frequency range and then this modulated video carrier and the voice signals are multiplexed for simultaneous transmission. FIG. 2 graphically shows a spectrum distribution of a carrier that is directly frequency-modulated by the NTSC signal.

Figure 3:
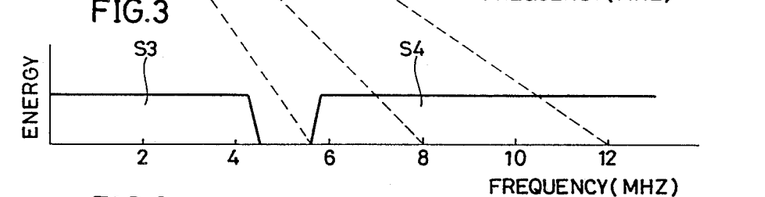
FIG. 3 is a spectrum distribution diagram obtained when the carrier is demodulated into the NTSC signal.

At an output of a demodulator, as shown in FIG. 3, the 2nd harmonic component S4 of the FM carrier spectrum is superposed on the demodulated video signal S3. This wide-band unless component S4 can be removed by means of a low-pass filter so that only the required video signal S3 is obtained.

However, if the carrier frequency of the video signal is set too low, the lower side of the 2nd harmonic component S4 of the FM carrier will overlap the upper-side component of the demodulated video signal at the output of the demodulator to consequently bring about beat interference. Since it is necessary to set the carrier frequency as high as 4.5 to 5.5 MHz, according to the conventional method of transmission, it follows that the widening of the bandwidth necessary for this FM carrier transmission will eventually raise a problem in multichannel transmission or the like.

There is also conventional means for baseband transmission of a video signal along a telephone communication cable. Here the telephone communication cable is not only limited to an inhouse cable alone (for example, a communication cable composed of a pair of parallel or twisted wires each having a diameter of 0.65 mm and coated with polyvinyl chloride), but also to an interphone it includes parallel vinyl lines generally used for supplying AC power (composed of a pair of twisted wires (20/0.18 or 30/0.18)). These various communication cables will be referred to simply as cable. A problem with using such cable is that the cable is harmfully affected by external radio waves, and particularly, medium waves (550–1350 kHz) which have been induced along the cable to cause beat interference and so forth on a reproduced picture at the receiving end. That is, on a television picture, there will appear beat pattern if any interference wave superposed on the video signal is more than −50 dB, whereby the picture quality will deteriorated. In order to eliminate "normal mode" interference, a push-pull transmission with balancers may be preferable, but it is still difficult to completely prevent "common mode" disturbance caused by medium waves having high field-intensity. Furthermore, due to the necessity of fixing the cable with staples or threading the cable through an iron pipe or so forth, it is unavoidable that some effects are actuated with respect to the environmental condition for the cable, hence causing multipath reflection of the carrier being transmitted through the cable. Particularly, transmission characteristics of a span of cable over 100 meters indicate a uniform descending curve at high frequencies occasionally with some dips of −6 dB or so at medium frequencies (0.5 to 2 MHz) caused by impedance mis-matching the cable's terminators. It may be contrived to transmit the video signal by the use of a co-axial cable for the purpose of obtaining satisfactory reproduced picture. However, for example, when replacing existing equipment for interphone with new equipment including a door phone camera to pick up visitors, there still remains a disadvantage of requiring additional work for installing another separate co-axial cable besides the existing one.

OBJECTS AND SUMMARY OF THE INVENTION

The present invention addresses the problems mentioned above. The principal objective of the present invention is to provide an improved method for multiplexing and transmitting audio and video signals, which is capable of separating the pass-band necessary for the frequency-modulated carrier of video signal from that necessary for audio signals and also from the broadcast band of medium waves.

And another objective of the present invention is to provide an improved method which ensures high quality reproduction of picture when facilitating in multiplex transmission of audio and video signals through cables.

Other objectives and further scope of applicability of the present invention will become apparent from the detailed description given below. It should be understood, however, that the detailed description and specific examples, while indicating preferred embodiments of the invention, are given by way of illustration only, since various changes and modifications within the spirit and scope of the invention will become apparent to those skilled in the art from this detailed description.

In order to achieve such objectives, the present invention is constituted as follows.

In a signal multiplex transmission, video signals, to be transmitted unidirectionally or bidirectionally, are multiplex with audio signals to be in baseband-transmitted bidirectionally, and these multiplexed signals are transmitted simultaneously through a pair of telephone communication cables. At the transmitting end of a video signal, first the video signal is separated into a luminance signal and a chrominance signal. Then the carrier is frequency-modulated with the luminance signal while the chrominance signal is down-converted to a lower band, and the audio signals and the frequency-modulated carrier of the luminance signal are transmitted simultaneously after being multiplexed by frequency division. At the receiving end, the luminance signal is reproduced by frequency-demodulation while the chrominance signal is up-converted into the original band, and the original video signal is restored by combining the reproduced luminance and chrominance signals with each other.

In another embodiment of the present invention, video signals, to be transmitted unidirectionally or bidirectionally, are multiplexed with audio signals to be transmitted bidirectionally, and then these multiplexed signals are transmitted simultaneously. At the carrier's transmitting end, a carrier of the video signal is frequency-modulated with a band ranging from 1 to 10 MHz, and thus, the modulated carrier modulated is multiplexed with the audio signals which are to be baseband-transmitted in a band below 10 kHz. Then the multiplex signals are transmitted to the carrier's receiving end through a pair or one of many pairs of telephone communication cables. Meanwhile on the receiving end, the multiplexed signals are separated into the audio signal and the video carrier, and then the separated video carrier is demodulated after removal of the amplitude component of the frequency modulated luminance signal by limiters.

BRIEF DESCRIPTION OF THE DRAWING

The present invention will be better understood from the detailed description given below and the accompanying drawings which are given by way of illustration only, and thus are not limitative of the present invention and wherein:

FIGS. 4 and 5 show a first embodiment of the present invention, in which

DESCRIPTION OF THE PREFERRED EMBODIMENTS

Figure 4:
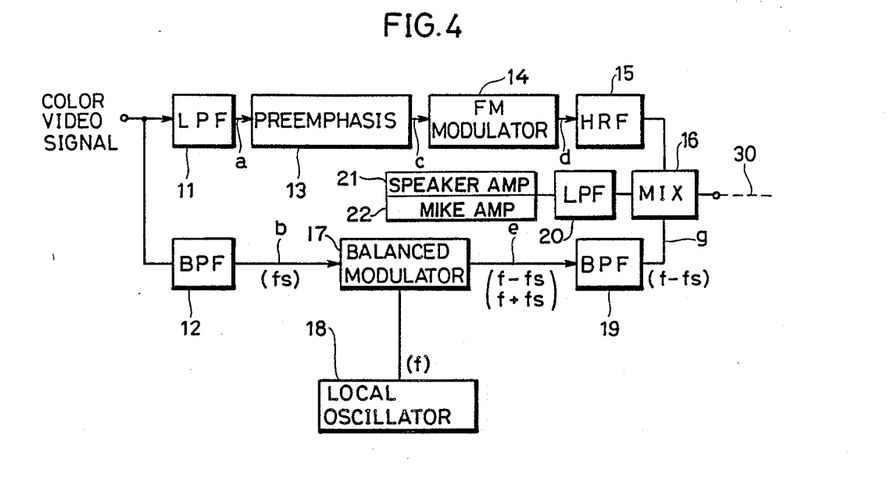
FIG. 4 is a block diagram of the outdoor's unit of door-phone camera equipment and FIG. 5 is a block diagram of the indoor's unit.
Figure 5:
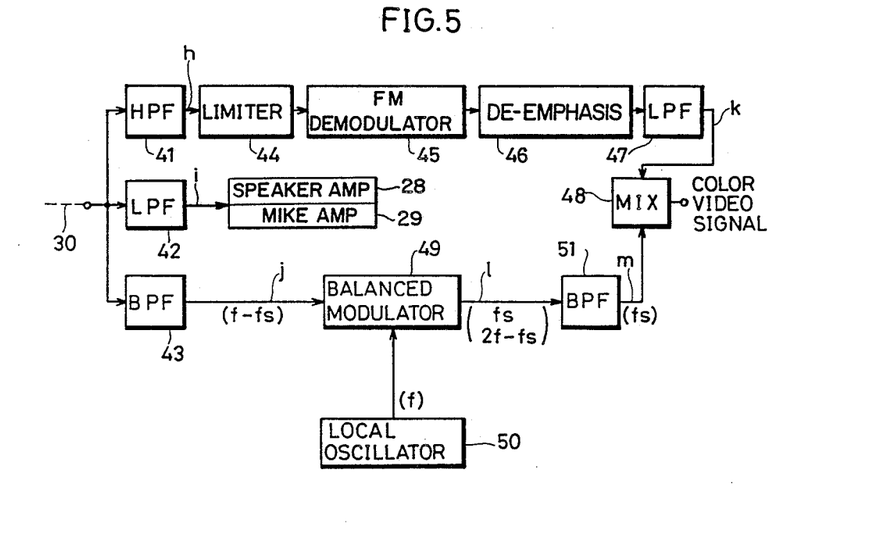

FIGS. 4 and 5 show transmission processors for an exemplary embodiment of the present invention, in which FIG. 4 is a block diagram of outdoor processors and FIG. 5 is that of indoor processors.

A color video signal which is inputted to the outdoor processors is separated into a luminance signal a and a chrominance signal b (frequency fs) through a low-pass filter 11 and a band-pass filter 12, respectively. The luminance signal a is fed to a preemphasis circuit 13 which serves to improve the signal-to-noise ratio, S/N, by emphasizing the high-frequency component of the luminance signal a. The luminance signal c thus emphasized is than fed to a frequency-modulator 14. A carrier's frequency of 3.4 MHz is allocated to the synchronizing-pulse's tip (i.e. sync-tip) and 4.4 MHz, to the white-peak of the video signal. The frequency-modulated luminance carrier d is fed to a mixer 16 through a high-pass filter 15.

Meanwhile, the chrominance signal b (frequency fs) separated by the band-pass filter 12 is fed to a balanced modulator 17, to which is also fed a carrier of a frequency f from a local oscillator 18. As the chrominance signal b is modulated with the carrier in a balanced manner, it is frequency-converted to a signal having frequency components e which correspond to the sum and the difference (f+fs, f−fs). Such components are fed to a band-pass filter 19, from which is obtained the difference component g between the two frequencies f and fs. In this embodiment, the chrominance signal around 3.58 MHz is down-converted to a signal around 0.629 MHz. The down-converted component g is fed to a mixer 16.

The mixer 16 is also supplied through low-pass filter 20 with two-way audio signals to be baseband-transmitted from mike amplifier 22 or to speaker amplifier 21. As a result, the mixer 16 produces an output by multiplexing the frequency-modulated luminance carrier, the down-converted chrominance signal and the two-way audio signals, and then this output is sent through a pair of telephone communication cables 30.

The multiplex signals transmitted through the telephone communication cable 30 are inputted to the indoor processors shown in FIG. 5. The input multiplex signals are introduced to high-pass filter 41, band-pass filter 43, and low-pass filter 42 disposed in the first stage of the indoor processors, whereby the multiplex signals are separated into frequency-modulated luminance carrier h, two-way audio signals i and down-converted chrominance signal j. Through low-pass filter 42, the two-way audio signals are fed to speaker amplifier 28 or from mike amplifier 29 and the frequency-modulated luminance carrier h is fed to a limiter 44, where the amplitude component of the frequency modulated luminance signal is removed. The output of the limiter 44 is fed to a frequency demodulator 45 for demodulation and then to a deemphasis circuit 46 which suppresses the high-frequency component emphasized on the transmitter (outdoor) side. The output of the deemphasis circuit 46 is fed to 46 low pass filter 47, and the luminance signal k is reproduced through the low-pass filter 47 in the next stage.

Meanwhile, the down-converted chrominance signal j separated by the band-pass filter 43 is fed to a balanced modulator 49, which then modulates the output (frequency f) of a local oscillator 50 and the down-converted chrominance signal j to produce a signal l having frequency components fs and 2f−fs. This output signal l is fed to a band-pass filter 51, from which a chrominance signal m (frequency fs) is restored.

The chrominance signal m thus restored is fed to a mixer 48, which mixes the chrominance signal m with the luminance signal k to reproduce the color video signal.

Figure 6:
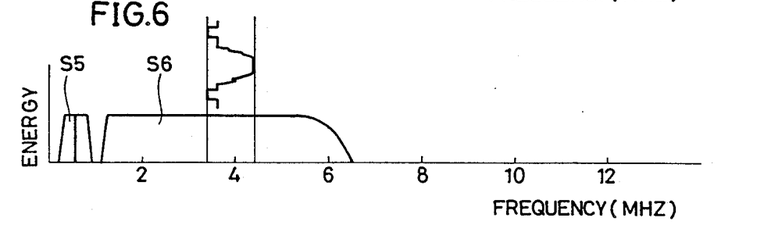
FIG. 6 is a spectrum distribution diagram of down-converted chrominance signal and a frequency-modulated luminance carrier.

Due to the conversion of the chrominance signal (frequency fs; 3.58 MHz) to a lower band around e.g. 0.629 MHz as described above, a deviation of the carrier of the luminance signal can be set into a range as low as 3.4 to 4.4 MHz. This is obvious from the fact that, with removal of the chrominance signal component from the NTSC signal, the luminance signal bandwidth of merely 2 MHz or more seems to be practically enough as seen in home VTRs. FIG. 6 shows a spectrum distribution obtained when the chrominance signal is down-converted to a lower band the sync-tip and white-peak frequencies of the luminance carrier are allocated to 3.4 and 4.4 MHz. In this diagram, S5 and S6 represent the down-converted chrominance signal and the frequency-modulated luminance carrier, respectively. As will be clear from comparison of FIG. 6 with FIG. 2, the bandwidth of the luminance carrier transmitted is extremely narrowed in this embodiment. It signifies that multi-channel transmission of video signals is possible.

Figure 7:
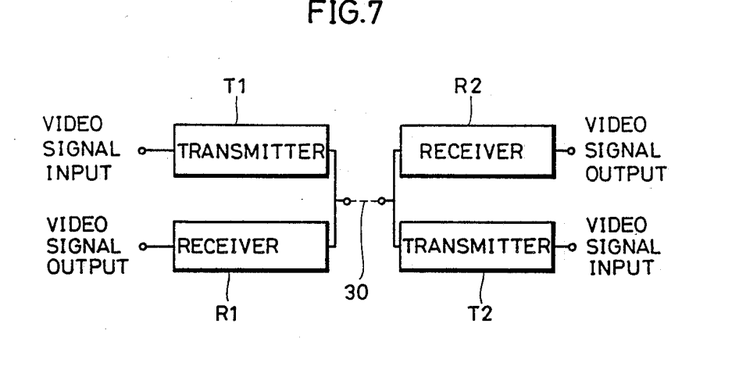
FIG. 7 is a block diagram schematically showing the construction of a bidirectional video transmission equipment according to a second embodiment of the present invention.
Figure 8:
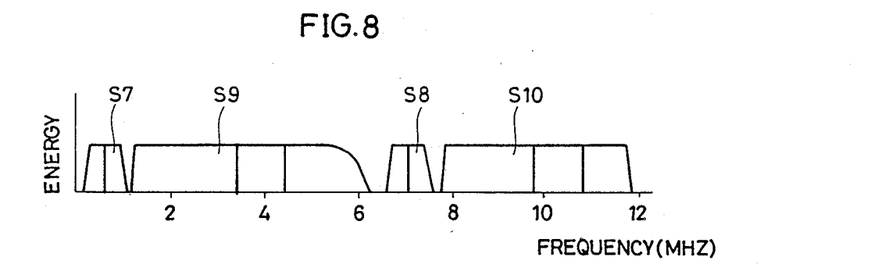
FIG. 8 is a spectrum distribution diagram in a bidirectional video transmission mode.

An example of such multichannel transmission is shown in FIG. 7, which is a block diagram of an embodiment for bidirectional transmission of a color video signal. In this diagram, carrier's transmitters T1 and T2 and carrier's receivers R1 and R2 as shown in FIGS. 4 and 5, respectively, are connected to the ends of a telephone communication cable 30, wherein bidirectional transmission of a color video signal is rendered possible by properly allocating the luminance carrier's modulation frequency and the chrominance signal conversion frequency in such a manner as to avert the spectra of the individual channels from overlapping. The spectra obtained in this example are shown in FIG. 8, wherein S7, S8 and S9, S10 represent the spectra of down-converted chrominance signals and those of frequency-modulated luminance carriers; respectively.

Figure 9:
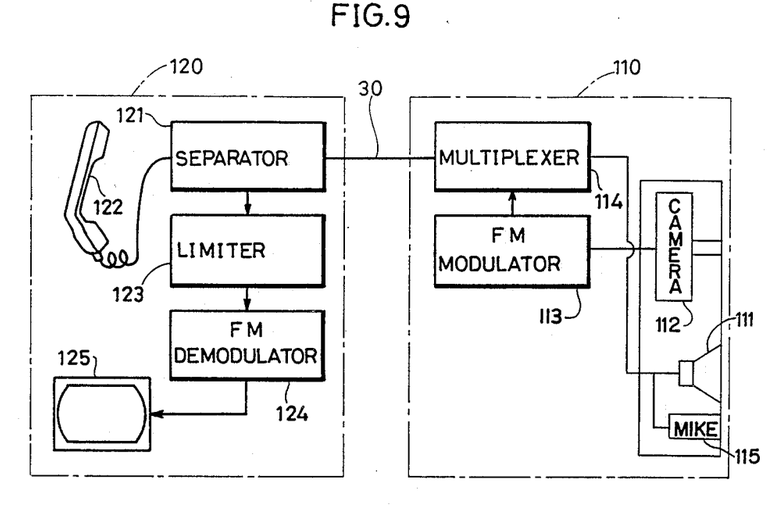
FIG. 9 is a block diagram schematically showing the construction of a door-phone camera multiplex transmission system according to a third embodiment which carries out the audio-video multiplex transmission method of the present invention.

FIG. 9 is a block diagram schematically showing the construction of another embodiment according to the present invention. This diagram illustrates a door-phone and camera multiplex transmission system consisting of a outdoor unit 110 and a indoor unit 120. The outdoor unit 110 comprises a speaker 111, a mike 115 and a CCD camera 112 for picking up visitors' figure and voice and also internally includes an FM modulator 113 for frequency-modulating a carrier with the video signal outputted from the CCD camera 112, and a multiplexer 114 for multiplexing the two-way audio signals and the frequency-modulated video carrier.

The indoor unit 120 comprises a separator 121 for separating the multiplexed signals transmitted from the outdoor unit 110 into the audio signal and the video carrier, a handset 122, a limiter 123 for removing the amplitude component from frequency-modulated video carrier separated by the separator 121, an FM demodulator 124 for demodulating the frequency-modulated carrier after the removal of its amplitude component, and a television monitor 125 fed with the demodulated video signal. The output unit 110 and the indoor unit 120 are connected mutually by means of a inhouse cable 30. The cable 30 is composed of, for example, a pair of parallel PVC-coated wires each having a diameter of 0.65 mm.

In the embodiment of the construction mentioned above, the following operation is performed.

Figure 10:
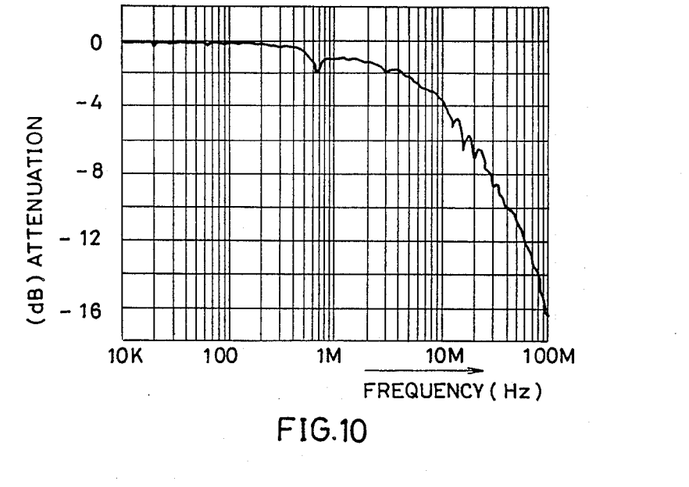
FIG. 10 graphically shows the transmission characteristics of a PVC cable made of parallel wires of 0.65 mm in each diameter and 50 m in length.
Figure 11:
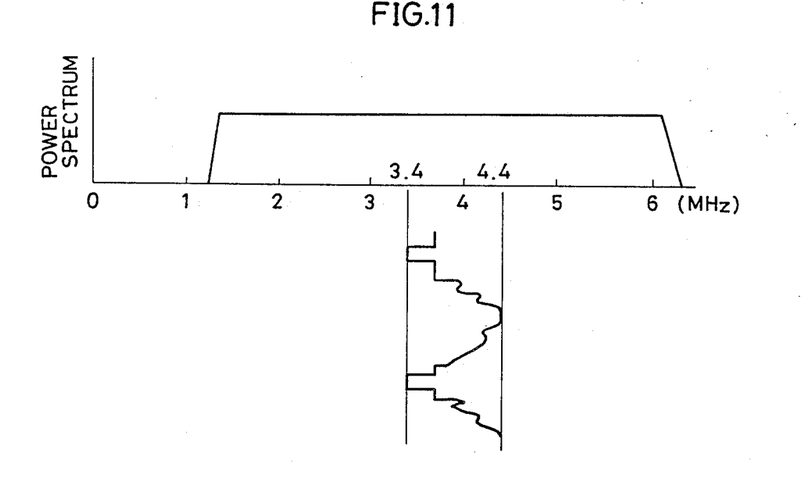
FIG. 11 is a spectrum distribution diagram of a frequency-modulated video carrier in the embodiment.

FIG. 10 graphically shows the measured characteristic curve of the cable 30 (50 m in length) having a characteristic impedance of 140 ohms and employed in the embodiment. Dips at 650 kHz and 3 MHz in this graph result particularly from impedance mis-matching at the cable terminators. And the rugged portion of the curve at frequencies above 10 MHz results from multi-reflection generated at positions where the cable has been stapled to the walls and beams. The above is inferred from the fact that the dip frequencies are changed by the span of the cable. As will be understood from FIG. 10, the cable employed in this embodiment has transmission characteristics within −4 dB up to 10 MHz. Therefore, when a carrier is frequency-modulated in the FM modulator 113 with the video signal that is outputted with a bandwidth of 2 to 3 MHz from the CCD camera 112 in the outdoor unit 110, the carrier's spectrum is extended up to a range of 1.5 to 6.5 MHz as shown in FIG. 11, but the cable 30 is still capable of transmitting the frequency-modulated video carrier properly with slight attenuation.

Meanwhile, the audio signal outputted from the mike amplifier in the handset 111 is multiplexed with the frequency-modulated video carrier by the multiplexer 114. In this stage, crosstalk between the audio signal and the video carrier can be prevented by selectively allocating the audio channel in a frequency range below 10 kHz. The audio signal multiplexed with the video carrier can be bidirectionally transmitted as in the conventional interphone line due to its baseband-transmission performed usually in any ordinary interphone or the like.

The multiplex signals thus produced are transmitted from the outdoor unit 110 to the indoor unit 120 through the cable 30.

The cable 30 used in this embodiment is not furnished with an electro-magnetic shield, unlike a co-axial cable, so that if its transmission span is relatively long, a problem with regard to leakage electric field to external instruments arises. This problem will be discussed in a paper to be issued; "Door Phone Camera's Multiplex Transmission System", IEEE Transaction on Consumer Electronics.

In FIG. 9, the multiplex signals transmitted through the cable 30 are inputted to the separator 121 of the indoor unit 120, where the video carrier is separated from the audio signals by means of the high-pass filter (HPF) as shown in FIG. 5. Since the high-pass filter is so set to cause attenuation of the medium waves and the limiter 123 is set to cause a complete limiting action of the medium waves, it becomes possible, in any place except the vicinity of a medium wave broadcasting station where the electric field intensity is extremely high, to achieve complete suppression of interference by these external radio waves during transmission through the cable 30. Multipath reflection is prone to occur in the carrier transmission through the cable due to some change in the environmental condition of the cable as it is fixed with staples at predetermined intervals or is covered with an iron pipe or the like. However, the video carrier, even if subjected to the rugged attenuation resulting from such multipath reflection, can be kept free from harmful influence of the multipath reflection and so forth by the limiter function.

The frequency-modulated video carrier with its ruggedly attenuated component that is suppressed in the limiter 123, is demodulated in the FM demodulator 124 and then is fed to the television monitor 125.

Since the audio signal and the video signal are different in pass-band from each other as described previously, no crosstalk occurs and, by the function of the high-pass filter and the limiter 123, which sufficiently suppresses the amplitude component of the frequency modulated luminance signal resulting from external radio waves and so forth, a remarkably high quality is attainable in the picture reproduced on the television monitor 125. Furthermore, when replacing the interphone system in use with a TV door-phone system (including a CCD camera such as 112 in this embodiment), there is no necessity for installing a new co-axial cable for the transmission of the video already installed telephone cable can be converted to carry the video signal, thus consequently the user saves the installation cost.

Figure 12:
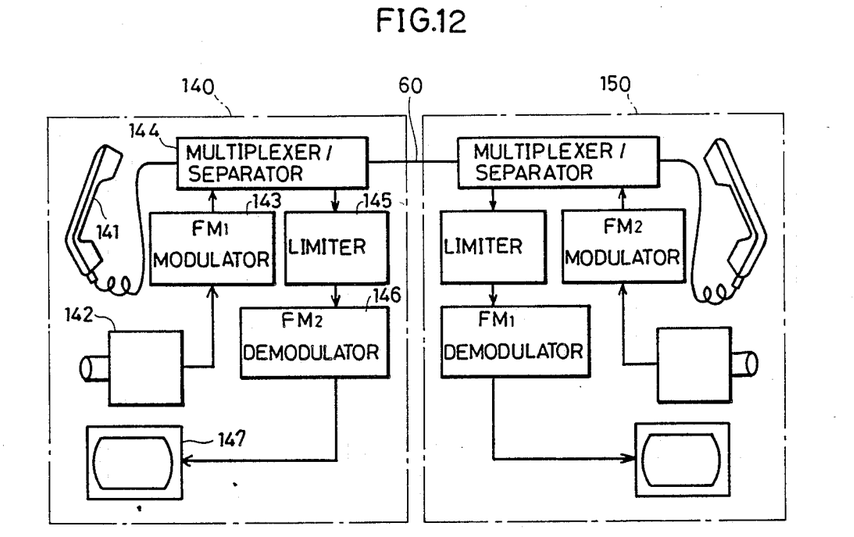
FIG. 12 is a block diagram schematically showing the construction of a inhouse TV telephone system according to a fourth embodiment of the present invention.

By using a pair of parallel PVC-coated wires as a cable 30 in the above embodiment, it is also possible, as shown in FIG. 12, to realize a inhouse television telephone system for bidirectional transmission of the video signals.

In FIG. 12, a terminal unit 140 comprises a hand-set 141, a CCD camera 142 for picking up a speaker, an FM modulator 143 for frequency-modulating a carrier with the video signal outputted from the CCD camera 142, a multiplexer/separator 144 for multiplexing the audio signal from mike amplifier and the frequency-modulated video carrier while separating the transmitted multiplexed signals into the audio signal and the video carrier, a limiter 145 for removing the amplitude component of the frequency modulated luminance signal from the separated video carrier, an FM demodulator 146 for demodulating the video carrier after the function of the limiter 145, and a television monitor 147 supplied with the demodulated video signal. Another terminal unit 150 has the same construction as that of the above-mentioned terminal unit 140. These terminal units 140 and 150 are connected with each other through a single cable 60, which has the same transmission characteristics as that of the cable 30 shown previously in FIG. 10.

Figure 13:
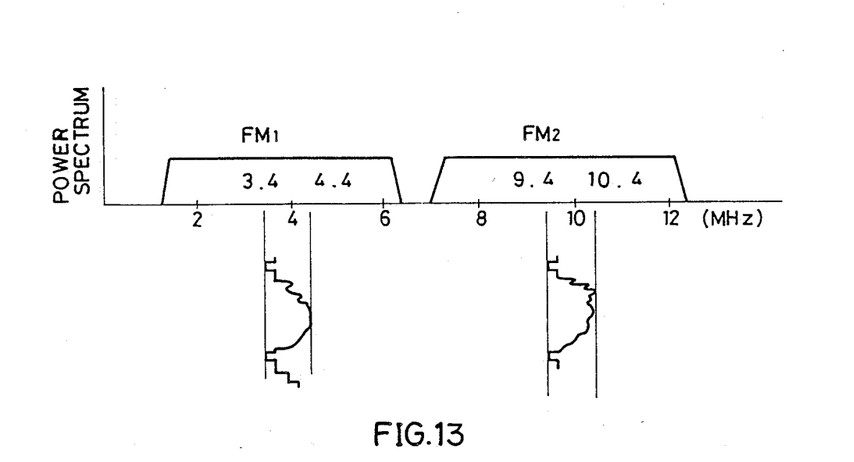
FIG. 13 is a spectrum distribution diagrams of bidirectional frequency-modulated video carriers in the embodiment of FIG. 12.

If the video carriers transmitted from the two terminal units 140 and 150 are selected so that their carriers' spectra are distributed within a range of 1 to 13 MHz as shown in FIG. 13 and allocated without mutual overlapping, then it becomes possible for the cable 60 to transmit the video carriers properly to the receiving ends without substantial attenuation, whereby the cable characteristic deterioration of the carrier at high frequencies can be compensated by a cable compensator to consequently attain proper reproduction of picture without substantially deteriorating the signal-to-noise ratio.

Figure 14:
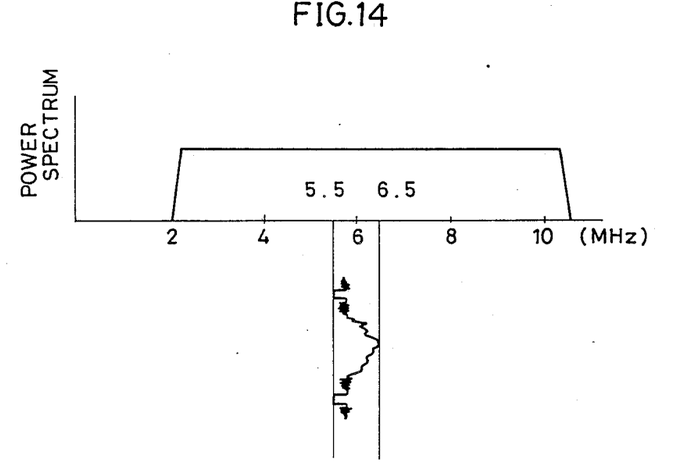
FIG. 14 is a spectrum distribution diagram of a frequency-modulated NTSC carrier transmitted according to another embodiment of the present invention.

Such composite signals as NTSC (National Television System Committee) signals or PAL (Phase Alternation Line) signals are composed of the chrominance and luminance signals, and the carrier directly frequency-modulated with the composite signal can be transmitted through the above-mentioned cable. In an exemplary case of transmission of NTSC signal, FIG. 14 shows the frequency distribution of an FM carrier on "low-band color mode" formerly adopted in four-head videotape recorders for broadcasting stations. As will be clear from comparison between the two cable transmission characteristics shown in FIGS. 10 and 14, the directly frequency-modulated carrier spectrum as shown in FIG. 14 ranges substantially within a band of 2 to 11 MHz so that the high frequency component of the carrier is slightly deteriorated by the cable transmission, but such deterioration is so small as be compensable with facility. Although such "low-band color mode" was adopted in the initial-stage color videotape recorders, it was replaced shortly later with "high-band color mode" on the basis of improvements in both tape and head performances as the former was disadvantageous with regard to tape noise and so forth due to a small modulation index. However, since noise source in this cable are principally interference induced by external radio waves and usually very small, the low-band color mode is sufficiently effective in practical use because, when the cable length is less than a few hundreds meters, a considerable high C/N (ratio of carrier to noise) is attainable in most cases.

As another means to transmit a color signal, there is a so-called TCI (Time Compression Integration) signal transmission system which multiplexes a time-compressed color-difference signal during the horizontal blanking period of a luminance signal by line alternation.

The TCI signal in which the luminance signal is supposed to have a bandwidth of 3 MHz, can comprise the color-difference signals, (R—Y) and (B—Y), of 0.4 MHz in bandwidth, which effective duration of a horizontal scan, 53 s, is time-compressed to one-seventh, 7.5 s. Since the horizontal blanking duration of NTSC signal amounts to about 11 s, the time-compressed color-difference signals are able to be accommodated with a horizontal narrower pulse of 2 s in pulsewidth during the blanking period in line alternation.

As shown in S5 of FIG. 6 and in S7 of FIG. 8, the passband of the down-converted chrominance signal is unfortunately overlapped with those of medium waves for broadcasting, so that this signal suffers interference from broadcasting waves, the transmission using the carrier frequency-modulated with the TCI signal may be preferable rather than the transmission using the down-converted chrominance signal.

The method of audio-video multiplex transmission according to the present invention is applicable to PAL, SECAM or TCI signals as well as to the aforementioned NTSC signal.

Furthermore, in case the signal-to-noise ratio (S/N) of the chrominance signal is deteriorated by interference of some external radio waves induced along the telephone communication cable, the S/N can be improved by use of a comb filter in the NTSC or PAL system where there exists a line interrelation. Also in the SECAM system where the chrominance signal is frequency-modulated, the S/N can be improved by the provision of a limiter.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A method for transmitting and receiving multiplexed audio-video signals between two sets of transmitters/receivers, one transmitter/receiver set at each of a first and second station, by a pair of telephone communication cables, by multiplexing baseband audio signals and video signals, the baseband audio signals being bidirectional, comprising the steps of:
   (a) frequency modulating the video signals at said first station with a first low frequency carrier;
   (b) multiplexing the frequency-modulated video signals of step (a) with the baseband audio signals at said first station;
   (c) frequency modulating the video signals of said second station with a second low frequency carrier, different from said first low frequency carrier;
   (d) multiplexing the frequency-modulated video signal of step (c) with baseband audio signals at said second station such that said multiplexed signals at each of said first and second stations both operate at different frequencies;
   (e) simultaneously transmitting each of the multiplexed signals of steps (b) and (d) through the pair of telephone communication cables in a bidirectional manner;
   (f) separating the multiplexed signals of step (d) and (b) into audio signals and frequency-modulated video signals at each of said first and second stations respectively;
   (g) removing an amplitude component from each of the separated frequency-modulated video signals of step (f);
   (h) frequency demodulating each of the frequency modulated video signals of step (g), thereby allowing bidirectional transmission of the audio and video signals.

2. The method as claimed in claim 1, wherein the low frequency carrier of step (a) is within a frequency range of 1 to 10 MHz, and the baseband audio signal of step (b) is being transmitted in step (c) below 10 KHz.

3. A method for transmitting and receiving multiplexed audio-video signals through a pair of telephone communication conductors by multiplexing a baseband audio signal and a video signal, comprising the steps of:
   (a) separating an original video signal into a luminance signal and a chrominance signal;
   (b) frequency modulating the separated luminance signal of step (a) with a low-frequency carrier;
   (c) converting the separated chrominance signal of step (a) to a frequency lower than an original frequency of the chrominance signal;
   (d) multiplexing the baseband audio signal, the frequency-modulated luminated signal of step (b), and the frequency-converted chrominance signal of step (c) by frequency division;
   (e) transmitting the multiplexed signal of step (d);
   (f) separating the transmittal signal of step (e) into a baseband audio, a frequency modulated luminance signal, and a frequency converted chrominance signal;
   (g) frequency demodulating the frequency-modulated luminance signal of step (f);
   (h) converting the frequency-converted chrominance signal of step (f) to the original frequency of the chrominance signal; and
   (i) combining the signals of steps (g) and (h) to obtain the original video signal of step (a).

4. The method as claimed in claim 3, wherein the method further comprises the steps of:
   (j) frequency modulating the chrominance signal of step (a) before accomplishing step (c); and
   (k) pre-emphasizing the luminance signal of step (a) before accomplishing step (b), by emphasizing a high-frequency component of the luminance signal.

5. The method as claimed in claim 4, wherein the method further comprises the steps of:
   (l) low pass filtering the luminance signal of step (a) before accomplishing step (k);
   (m) band pass filtering the chrominance signal of step (a) before accomplishing step (j);
   (n) high pass filtering the frequency-modulated luminance signal of step (b) before accomplishing step (d);
   (o) band pass filtering the frequency-converted chrominance signal of step (c) before accomplishing step (d); and
   (p) low pass filtering of the baseband audio signal before accomplishing step (d).

6. The method as claimed in claim 5 wherein the method further comprises the steps of:
   (q) removing an amplitude component of the frequency-modulated luminance signal of step (f) before accomplishing step (g).

7. The method as claimed in claim 6, wherein the method further comprises the steps of:
   (r) high pass filtering the frequency-modulated luminance signal of step (d) before accomplishing step (q);
   (s) low pass filtering the baseband audio signal of step (d);
   (t) band pass filtering the frequency converted chrominance signal of step (d) before accomplishing step (h);
   (u) suppressing the high frequency component of the frequency-modulated luminance signal of step (q) that was emphasized in step (k) subsequent to step (g);
   (v) low pass filtering the frequency demodulated luminance signal of step (g) before accomplishing step (i); and
   (w) band pass filtering the frequency converted chrominance signal of step (h) before accomplishing step (i).

8. The method as claimed in claim 3, wherein the low frequency carrier of step (b) is within a frequency range of 1 to 10 MHz.

9. An apparatus for transmitting and receiving multiplexed audio-video signals through a pair of telephone communication conductors by multiplexing a baseband audio signal and a video signal, comprising:
   a transmitter including,
      first separating means for separating an original signal into a luminance signal and a chrominance signal,
      first modulating means for modulating the separated luminance signal with a low-frequency carrier,
      first converting means for converting the separated chrominance signal to a frequency lower than its original frequency,
      multiplexing means, operatively connected to said first converting means and said modulating means, for multiplexing the baseband audio signals the frequency-modulated luminance signal, and the frequency-converted chrominance signal by frequency division, and transmitting means, connected to said multiplexing means, for transmitting the multiplexed signal; and a receiver including, second separating means operatively connected to said transmitting means for separating the transmitted signal into a baseband audio, a frequency modulated luminance signal, and a frequency converted chrominance signal, demodulating means, operatively connected to said second separating means, for frequency demodulating the frequency-modulated luminance signal, second converting means, operatively connected to said separating means, for converting the frequency-converted chrominance signal to its original frequency, and combining means, connected to said demodulating means and said second converting means, for combining the signals to obtain the original video signal.

10. The apparatus as claimed in claim 9, further comprising:

second modulating means, connected to said first converting means, for modulating the chrominance signal prior to converting said chrominance signal; and pre-emphasizing means, connected to said first modulating means, for pre-emphasizing the luminance signal prior to modulating said luminance signal, by emphasizing a high-frequency component of the luminance signal.

11. The apparatus as claimed in claim 10, further comprising first low pass filtering means, connected to said pre-emphasizing means, for low pass filtering the luminance signal prior to pre-emphasizing of said luminance signal;

band pass filter means, connected to said separating means, for low band filtering the chrominance signal;

high pass filtering means, connected to said first modulating means for high pass filtering the frequency modulated luminance signal;

said second converting means band pass filtering the frequency-modulated chrominance signal to convert said chrominance signal to a lower frequency signal; and second low pass filtering means, connected to said multiplexing means, for low pass filtering of the baseband audio signal prior to said multiplexing means.

12. The apparatus as claimed in claim 9, wherein the apparatus further comprises:

limiting means, connected to said second separating means, for removing an amplitude component of the frequency modulated luminance signal.

13. The apparatus as claimed in claim 12, wherein the apparatus further comprises:

high pass filtering means, connected to said second separating means, for high pass filtering the frequency-modulated luminance signal;

first low pass filtering means, connected to said second separating means, for low pass filtering the baseband audio signal first band pass filtering means for band pass filtering the frequency converted chrominance signal supressing means, connected to said demodulating means, for suppressing the high frequency component of the frequency-modulated luminance signal that was emphasized, subsequent to said luminance signal being demodulated;

second low pass filtering means, connected to said demodulating means, for low pass filtering the frequency demodulated luminance signal; and second band pass filtering means, connected to said second converting means, for band pass filtering the frequency converted chrominance signal.

14. The apparatus as claimed in claim 9, wherein the low-frequency carrier of the first modulating means is within a frequency range of 1 to 10 MHz.

15. An apparatus for transmitting and receiving multiplexed audio-video signals between the two sets of transmitters/receivers, one transmitter/receiver set at each of a first and second station, by a pair of telephone communication cables, by multiplexing baseband audio signals and video signals, the baseband audio signals being bidirectional, comprising:

first frequency modulating means for frequency modulating the video signals at said first station with a first low frequency carrier;

first multiplexing means, operatively connected to said first frequency modulating means, for multiplexing said first frequency-modulated video signal with baseband audio signals at said first station;

second frequency modulating means for frequency modulating the video signal of said second station with a second low frequency carrier, different from said first low frequency carrier;

second multiplexing means, operatively connected to said second frequency modulating means, for multiplexing frequency-modulated video signal with baseband audio signals at said second station such that said multiplexed signals at each of said first and second stations both operate at different frequencies;

first and second transmitting means for simultaneously transmitting each of the multiplexed signals through the pair of telephone communication cables in a bidirectional manner;

first and second separating means for separating each of the multiplexed signals into audio signals and frequency-modulated video signals at each of said first and second stations respectively;

first and second limiting means, connected to said first and second separating means, respectively, for removing an amplitude component from each of the separated frequency-modulated video signals; and first and second frequency demodulating means, connected to said first and second limiting means, respectively, for frequency demodulating each of the frequency modulated video signals, thereby allowing bidirectional transmission of the audio and video signals.

* * * * *

UNITED STATES PATENT AND TRADEMARK OFFICE
CERTIFICATE OF CORRECTION

PATENT NO. : 4,955,048
DATED : September 4, 1990
INVENTOR(S) : S. Iwamura et al.

It is certified that error appears in the above-identified patent and that said Letters Patent is hereby corrected as shown below:

In column 8, line 38, change "53 s" to --53 µs--

In column 8, lines 38-39, change "7.5 s" to --7.5 µs--

In column 8, line 40, change "11 s" to --11 µs--

In column 8, line 42, change "2 s" to --2 µs--

Signed and Sealed this

Nineteenth Day of April, 1994

Attest:

BRUCE LEHMAN

Attesting Officer

Commissioner of Patents and Trademarks